(12) United States Patent
Dinu et al.

(10) Patent No.: US 10,503,326 B2
(45) Date of Patent: Dec. 10, 2019

(54) DISPLAY NOISE COMPENSATION IN TOUCH SCREEN DISPLAY USING CAPACITIVE DIVIDERS

(71) Applicant: STMicroelectronics Asia Pacific Pte Ltd, Singapore (SG)

(72) Inventors: Leonard Liviu Dinu, Singapore (SG); Chee Weng Cheong, Singapore (SG); Eng Jye Ng, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 326 days.

(21) Appl. No.: 15/247,106

(22) Filed: Aug. 25, 2016

(65) Prior Publication Data

US 2018/0059818 A1    Mar. 1, 2018

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
None
See application file for complete search history.

(56) References Cited

U.S. PATENT DOCUMENTS

| 8,743,062 | B2 | 6/2014 | Krah et al. | |
|---|---|---|---|---|
| 2011/0261006 | A1* | 10/2011 | Joharapurkar | G06F 3/0416 345/174 |
| 2012/0075240 | A1* | 3/2012 | Kida | G06F 3/044 345/174 |
| 2012/0139846 | A1* | 6/2012 | Krah | G06F 3/0418 345/173 |
| 2012/0194204 | A1* | 8/2012 | Lee | G06F 3/0416 324/705 |
| 2012/0299869 | A1* | 11/2012 | Hung | G06F 3/044 345/174 |
| 2016/0148034 | A1* | 5/2016 | Kremin | G06K 9/0002 382/124 |
| 2016/0188951 | A1* | 6/2016 | Benkley | G06K 9/00033 382/124 |
| 2016/0342265 | A1* | 11/2016 | Geaghan | G06F 3/044 |

* cited by examiner

*Primary Examiner* — Stephen T. Reed
(74) *Attorney, Agent, or Firm* — Crowe & Dunlevy

(57) ABSTRACT

An electronic device disclosed herein includes a display layer generating display noise based on scanning thereof, and a sensing layer including a plurality of sense lines. A common voltage layer is coupled to the display layer and the sensing layer, with the common voltage layer capacitively coupling the display noise from the display layer to the each of the plurality of sense lines of the sensing layer via a different parasitic impedance. An amplitude of the display noise seen at an input to each sense line is a function of a location of that sense line. The electronic device includes a plurality of compensation impedances, with each compensation impedance coupled to a different one of the plurality of sense lines. Each of the plurality of compensation impedances has an impedance value such that an amplitude of the display noise at an output of each sense line is substantially equal.

26 Claims, 4 Drawing Sheets

DISPLAY NOISE COMPENSATION IN TOUCH SCREEN DISPLAY USING CAPACITIVE DIVIDERS

TECHNICAL FIELD

This disclosure is related to the field of touch screen displays, and more particularly to the compensation of display noise using capacitive dividers.

BACKGROUND

Handheld electronic devices such as smartphones, tablets, and smartwatches are popular with consumers and are sold in great numbers. The majority of these devices employ a touch sensitive display for both display of output to a user and accepting data as input from a user. Most of these touch sensitive displays utilize capacitive touch sensing.

A typical such touch sensitive display includes a display layer constructed from technology such as LCD, IPS, or AMOLED, as well as a sensing layer. A typical sensing layer includes a plurality of parallel drive lines, and a plurality of parallel sense lines. The sense lines capacitively intersect the drive lines. In operation, a single drive line is driven with a wave, such as a square wave or sine wave. The capacitance between the sense lines and the driven drive line is sensed at the point where they intersect. Presence of a human finger or a conductive object alters the expected capacitance at the intersection point, and by measuring the change in capacitance, a touch between the finger or object and the touch sensitive display can be detected.

Consumer desires for these handheld electronic devices are for the devices to grow increasingly thin. This accordingly results in the desire to make touch sensitive displays increasingly thin. However, as such touch sensitive displays grow thinner, noise from the display layer becomes an increasing problem for the sensing layer, as the thinner designs result in greater parasitic capacitances coupling the noise from the display layer through to the sensing layer. This noise, when coupled through to the sensing layer, degrades accuracy of the touch sensing performed by the sensing layer, which is commercially undesirable.

While methods of reducing the coupling of this noise from the display layer through to the sensing layer are known, and while methods of rejecting the noise that is coupled through, those methods may still allow an undesirable amount of display noise to be coupled through to the sensing layer. Therefore, further development is still needed.

SUMMARY

This summary is provided to introduce a selection of concepts that are further described below in the detailed description. This summary is not intended to identify key or essential features of the claimed subject.

An electronic device disclosed herein includes a display layer generating display noise based on scanning thereof, and a sensing layer including a plurality of sense lines. A common voltage layer is coupled to the display layer and the sensing layer, with the common voltage layer capacitively coupling the display noise from the display layer to the each of the plurality of sense lines of the sensing layer via a different parasitic impedance. The electronic device includes a plurality of compensation impedances, with each compensation impedance coupled to a different one of the plurality of sense lines. Each of the plurality of compensation impedances has an impedance value such that an amplitude of the display noise at an output of each sense line is substantially equal. An amplitude of the display noise seen at an input to each sense line may be a function of a location of that sense line. Amplitudes of the display noise seen at inputs to at least some of the sense lines may not be substantially equal.

Each of the plurality of compensation impedances forms an impedance divider with the parasitic impedance of its respective sense line. The common voltage layer is driven at a plurality of connection points; and wherein the amplitude of the display noise seen at the input to each sense line is a function of the location of that sense line with respect to the plurality of connection points.

The amplitude of the display noise seen at the input to each sense line is a function of a distance of that sense line from the plurality of connection points, where the amplitude of the display noise seen at the input to sense lines closer to the plurality of connection points is less than the amplitude of the display noise seen at the input to sense lines farther from the plurality of connection points.

Compensation impedances coupled to sense lines closer to the plurality of connection points are lesser in value than compensation impedances coupled to sense lines farther from the plurality of connection points. Each compensation impedance may include a compensation capacitor coupled between the output of its associated sense line and ground, where each impedance value is a capacitance value, where each parasitic impedance comprises a parasitic capacitance, and where the parasitic capacitance and compensation impedance for each sense line forms a capacitive divider.

A sense block is coupled to the plurality of sense lines, and configured to process output from each of the plurality of sense lines, and to output a sense signal for each sense line. A digital block is configured to program the capacitance value of each programmable value capacitor as a function of the sense signal for the sense line associated with that programmable value capacitor. The sense block processes the output from each of the plurality of sense lines by rejecting the display noise from the sense signal output for each sense line. The sense block rejects the display noise by performing differential sensing of the plurality of sense lines.

Each compensation impedance may be a fixed value capacitor, and each impedance value may be a capacitance value.

Each compensation impedance may be a programmable value capacitor, and each impedance value may be a capacitance value.

A method aspect is directed to a method of operating a touch sensing device having a display layer, a common voltage layer, and a sensing layer. The method may include generating display noise by scanning the display layer, capacitively coupling the display noise from the display layer to the common voltage layer via at least one parasitic impedance, and capacitively coupling the display noise from the common voltage layer to the each of a plurality of sense lines in the sensing layer via a different parasitic impedance. The method may further includes compensating for different amplitudes of the display noise and for the different parasitic impedances by coupling a different compensation impedance to a different one of the plurality of sense lines, where each of the compensation impedances has an impedance value such that an amplitude of the display noise at an output of each sense line is substantially equal.

The method includes driving the common voltage layer at a plurality of connection points, such that the amplitude of the display noise seen at the input to each sense line is a function of the location of that sense line with respect to the plurality of connection points.

The driving of the common voltage layer at the plurality of connection points results in the amplitude of the display noise seen at the input to each sense line being a function of a distance of that sense line from the plurality of connection points, such that the amplitude of the display noise see at the input to sense lines closer to the plurality of connection points is less than the amplitude of the display noise seen at the input to sense lines farther from the plurality of connection points.

The compensation impedances coupled to sense lines closer to the plurality of connection points are lesser in value than compensation impedances coupled to sense lines farther from the plurality of connection points.

Output from each of the plurality of sense lines is processed and a sense signal is output for each sense line.

Processing the output from each of the plurality of sense lines includes rejecting the display noise from the sense signal output for each sense line.

The display noise may be rejected by performing differential sensing of the plurality of sense lines.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
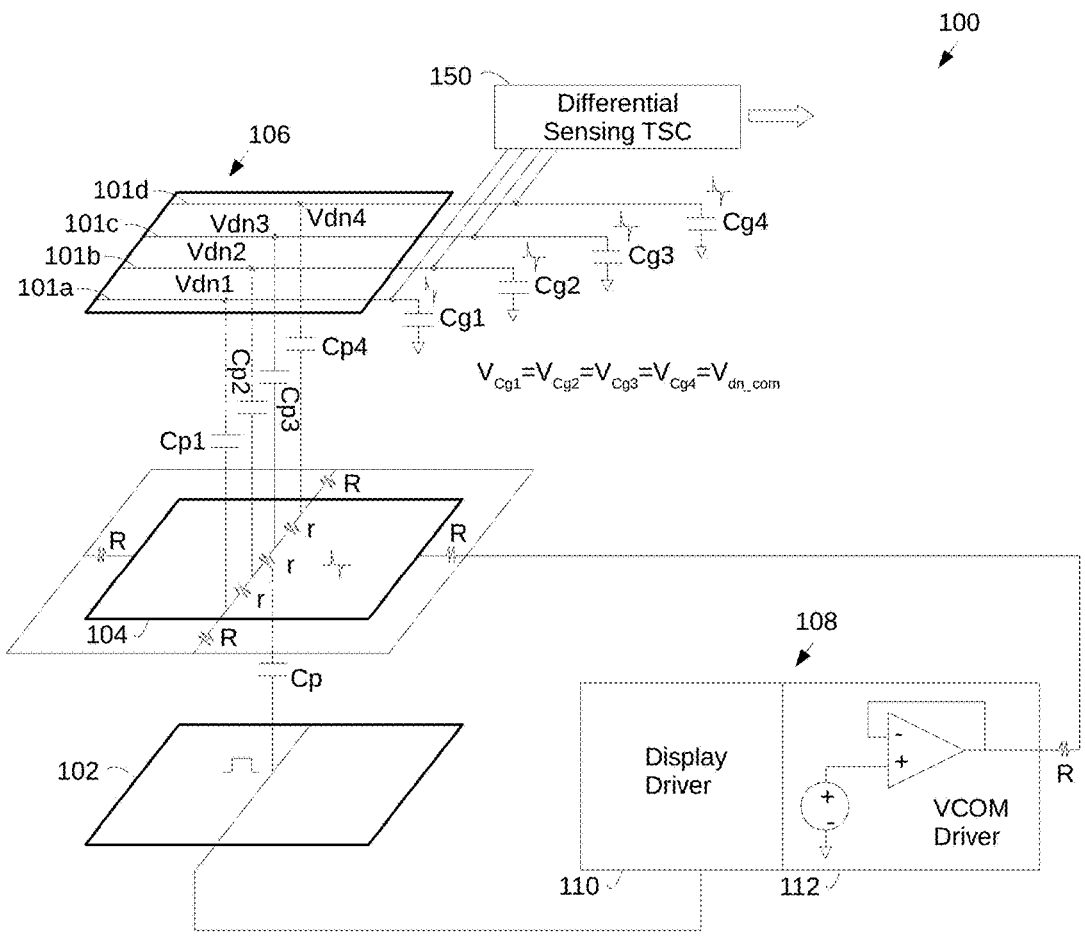
FIG. 1 is schematic block diagram of touch screen in which display noise is rejected in a plurality of sense lines, in accordance with this disclosure.

With initial reference to FIG. 1 a touch sensitive display 100 for an electronic device is now described. The electronic device may be a smartphone, smartwatch, tablet, laptop, or other suitable portable electronic device. The touch sensitive display 100 includes a display layer 102 with a common voltage layer (VCOM) 104 thereon. A touch sensing layer 106 is over the VCOM layer 104.

Figure 3:
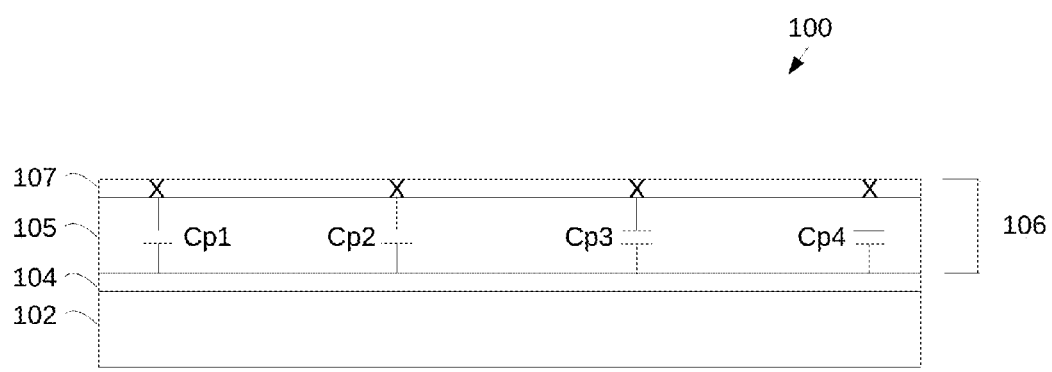
FIG. 3 is a schematic cross sectional diagram of the touch screen of FIG. 1 showing the arrangement of the display layer, VCOM layer, and sensing layer.

As best shown in FIG. 3, the touch sensing layer 106 is comprised of a touch layer substrate 105 having a touch sensor 107 formed thereon. The touch sensor 107 itself is formed by capacitively intersecting sense lines 101a-101d and a drive line 109. Although four sense lines 101a-101d are shown, there may be any number of such sense lines. Although one drive line 109 is shown for brevity, there may be any number of such drive lines.

A touch is detected via measuring the capacitance between the sense lines 101a-101d and the drive line 109. The VCOM layer 104 provides a common voltage, such as ground, to both the sensing layer 106 and the display layer 102. The VCOM layer 104 is supplied at multiple points about its perimeter, illustrated in FIG. 1.

Due to this VCOM layer 104, as will be explained in detail below, parasitic capacitances Cp1-Cp4 are formed between the sensing layer 106 and the VCOM layer 104, and a parasitic capacitance Cp is formed between the VCOM layer 104 and the display layer 102. For simplicity, four parasitic capacitances Cp1-Cp4 are shown, but it should be understood that there may be any number of parasitic capacitances formed between the sensing layer 106 and the VCOM layer 104, and between the VCOM layer 104 and the display layer 102.

The display layer 102 contains rows and columns of pixels that are scanned so as to form an image for display to a user. The display layer 102 is coupled to a display driver 110 which controls the display layer 102 using a horizontal sync signal HSYNC, which is a pulse that synchronizes the start of scanning of a row.

In operation, the drive line 109 is driven with a periodic signal, such as a square wave. At the intersection point between the drive line 109 and sense lines 101a-101d, the sense lines 101a-101d incurs a charge injection proportional to the voltage at the drive line 109 and a capacitance between the sense lines 101a-101d and the drive line 109 at that intersection point. This capacitance varies in proximity to conductive objects, such as human fingers, and is measured and processed by a touch screen controller (TSC) 150 so as to generate touch data for use by the electronic device.

Greater detail of the TSC 150 with reference to its operation on a single sense line 101a and the drive line 109 will now be given with reference to FIG. 2. The touch screen controller 150 includes a driver 122 coupled to the drive line 109 and controlled by a drive (or "force") signal Tx from the digital block 114. The sense line 101a is coupled to an integrator 116. The integrator 116 is coupled to an accumulator 118. The accumulator 118 is coupled to an analog to digital converter 120, which in turn is coupled to the digital block 114.

Generation of the touch data will now be described. The drive line 109 is driven with a periodic signal by the driver 122, under control of the digital block 114. At the intersection point between the drive line 109 and sense line 101a, the sense line 101a incurs a charge injection proportional to the voltage at the drive line 109 and a capacitance between the sense lines 101a and the drive line 109 at that intersection point. The integrator 116 integrates the signal on the sense line 109. The accumulator 118 sums the signals received from the integrator 116, and passes the sum to the analog to digital converter 120. The analog to digital converter 120 converts the sum to the digital domain and passes it to the digital block 114. The digital block 114 processes the sum to produce touch data, which it outputs.

The inventors have found that, at each HSYNC pulse, noise is capacitively coupled from the display layer 102 into the VCOM layer 104 via the parasitic capacitance Cp. Then, that noise is capacitively coupled from the VCOM layer 104 into the sensing layer 106 via the parasitic capacitances Cp1-Cp4. This noise causes unwanted charge injection which would degrade the accuracy and performance of the touch data generated by the touch screen controller 150. The inventors have therefore found that compensation impedances (illustratively capacitors) Cg1-Cg4 coupled between the sense lines 101a-101d and ground serve to compensate this noise and render it rejectable by the TSC 150.

As will be appreciated, the display layer 102 has a plurality of display lines, and scanning of the display layer 102 refers to the scanning of one or more of those display lines. The display noise generated at each HSYNC pulse may be a function of which specific display line is being scanned, although the difference between the noise generated by the different display lines may be insignificant.

In greater detail, the VCOM layer 104 is a reference plane having a resistance r. It is driven by a VCOM driver 112 through wires having a routing resistance R, at multiple connection points. Although four connection points are shown, other numbers of connection points may be used. The result of the VCOM layer 104 being driven at different connection points is that the amplitude of the display noise seen on the VCOM layer 104 is dependent on the position on the VCOM layer 104 at which the display noise is measured. Near the connection points, the amplitude of the display noise in the VCOM layer is less than far from the connection points.

Figure 4:
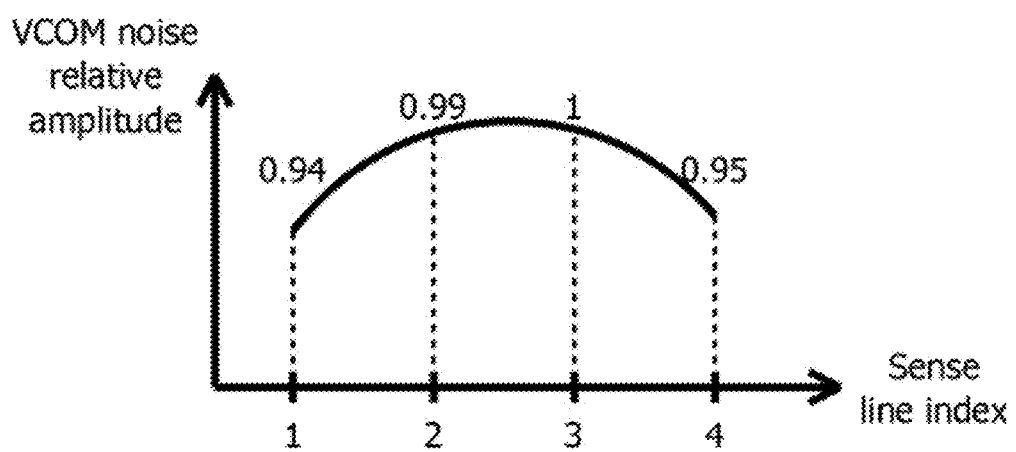
FIG. 4 is a graph showing a sample spread in display noise amplitude seen at each of the sense lines of FIG. 1.

It follows then that the amplitude of the display noise coupled through from the VCOM layer 104 to each sense lines 101a-101d depends on the location of each sense line relative to the connection points of the VCOM layer 104. Thus, each sense line 101a-101d may be subject to display noise of a different amplitude due to the location of that sense line relative to the connection points of the VCOM layer 104. This renders the amplitude of display noise at each sense line 101a-101d deterministic, with the difference in amplitude between sense lines 101a-101d being determinable, as shown in FIG. 4. Adding to this is the fact that the parasitic capacitances Cp1-Cp4 that couple the display noise from the VCOM layer 104 to the sense lines 101a-101d are not equal in value. Thus, the amplitude of the display noise experienced at the different sense lines 101a-101d may differ between 3% to 12%, or 5% to 10%. As a result of the different amplitude of display noise on each sense line 101a-101d, absent some sort of compensation, differential sensing performed by the TSC 150 might not be fully effective in rejecting this display noise.

Therefore, as shown in FIG. 1, compensation capacitors Cg1-Cg4 are directly electrically coupled between the output of the sense lines 101a-101d and ground without intervening components, thereby forming capacitive dividers with the parasitic capacitances Cp1-Cp1 that are coupled to the input of the sense lines 101a-101d. The compensation capacitors Cg1-Cp4 may each have different capacitance values which are sized so as to ensure that the amplitudes of the display noise components seen at the output of each sense line 101a-101d are substantially equal. Since the amplitude differences between the display noise at the sense lines 101a-101d is deterministic, the compensation capacitors Cg1-Cg4 may be standard fixed value capacitors.

Figure 2:
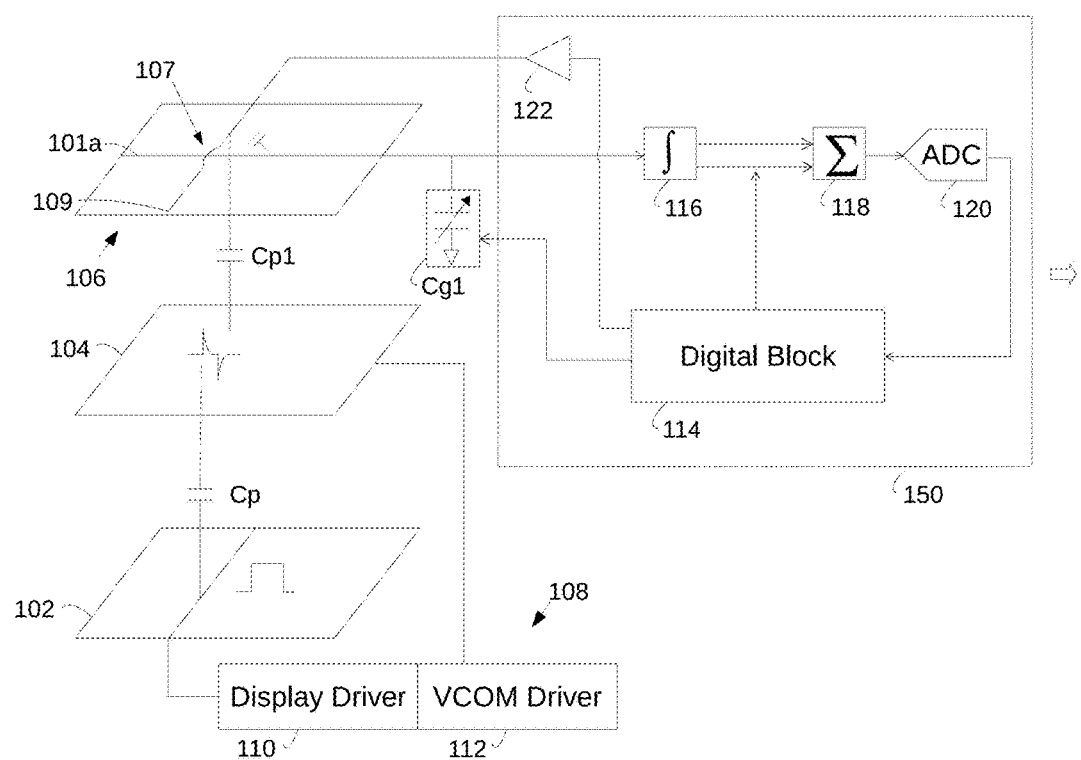
FIG. 2 is a schematic block diagram of the touch screen of FIG. 1 showing noise rejection in one of the sense lines.

In some applications, however, it may be desirable for the compensation capacitors Cg1-Cg4 to be programmable variable capacitors (as shown in FIG. 2). For example, where the electronic device 100 described above is manufactured as a discrete component intended to be incorporated into different consumer devices, such as different smartphones, tablets, smartwatches, etc. In such a scenario, the electronic device 100 can be incorporated within a sample consumer device, the display noise can be characterized during an initial tuning phase, and the programmable compensation capacitors Cg1-Cg4 may then be set to appropriate values so as to achieve proper noise rejection. In the tuning phase, the capacitances of the programmable compensation capacitors Cg1-Cg4 are iteratively varied until coupled display noise is reduced to a desirably low level.

So that the display noise at the output of each sense line 101a-101d has an equal amplitude, the values of the compensation capacitors Cg1-Cg4 are set as follows, either with fixed value capacitors or with programmable capacitors:

$$Vdn1 * \frac{Cp1}{Cp1+Cg1} = Vdn2 * \frac{Cp2}{Cp2+Cg2} =$$
$$Vdn3 * \frac{Cp3}{Cp3+Cg3} = Vdn4 * \frac{Cp4}{Cp4+Cg4} = \text{Vdn\_com,}$$

where Vdn1-Vdn4 represents the voltage of the display noise seen at the sense line 101a-101d, and where Vdn_com represents a common mode noise voltage produced at the output of each sense line 101a-101d after application of the voltage divider formed by the parasitic capacitors Cp1-Cp4 and the compensation capacitors Cg1-Cg4.

Thus, after application of the voltage divider formed by the parasitic capacitors Cp1-Cp4 and the compensation capacitors Cg1-Cg4, the common mode noise voltage Vdn_com can be rejected by the TSC 150 using a differential sensing scheme. For example, the integrator 116 (FIG. 2) may be part of a differential sensing circuit, and the digital block 114 monitors output of the ADC 120, from which it sets the value of the programmable capacitors Cg1-Cg4. This monitoring and setting may be performed once in a calibration mode, may be performed periodically, or may be performed continuously.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. An electronic device, comprising:
a display layer generating display noise based on scanning thereof;
a sensing layer including a plurality of sense lines;
a common voltage layer coupled to the display layer and the sensing layer, the common voltage layer capacitively coupling the display noise from the display layer to the each of the plurality of sense lines of the sensing layer via a different parasitic impedance; and
a plurality of compensation impedances equal in number to the plurality of sense lines, each compensation impedance being, and remaining, directly electrically connected between a different one of the plurality of sense lines and ground in an unbroken fashion during operation of the electronic device such that each compensation impedance is directly electrically connected between one of the plurality of sense lines and ground in an unbroken fashion during operation of the electronic device, and such that each sense line is directly electrically connected to one of the compensation impedances in an unbroken fashion during operation of the electronic device,
wherein each compensation impedance of the plurality of compensation impedances has an impedance value such that an amplitude of the display noise at an output of each sense line is substantially equal.

2. The electronic device of claim 1, wherein amplitudes of the display noise seen at inputs to at least some of the sense lines are not substantially equal.

3. The electronic device of claim 1, wherein an amplitude of the display noise seen at an input to each sense line is a function of a location of that sense line.

4. The electronic device of claim 1, wherein each of the plurality of compensation impedances forms an impedance divider with the parasitic impedance of its respective sense line.

5. The electronic device of claim 1, wherein the common voltage layer is driven at a plurality of connection points; and wherein an amplitude of the display noise seen at an input to each sense line is a function of the location of that sense line with respect to the plurality of connection points.

6. The electronic device of claim 5, wherein the amplitude of the display noise seen at the input to each sense line is a function of a distance of that sense line from the plurality of connection points, where the amplitude of the display noise seen at the input to sense lines closer to the plurality of connection points is less than the amplitude of the display noise seen at the input to sense lines farther from the plurality of connection points.

7. The electronic device of claim 5, wherein compensation impedances coupled to sense lines closer to the plurality of connection points are lesser in impedance value than compensation impedances coupled to sense lines farther from the plurality of connection points.

8. The electronic device of claim 1, wherein each compensation impedance comprises a compensation capacitor coupled between the output of its associated sense line and ground; wherein each impedance value is a capacitance value; wherein each parasitic impedance comprises a parasitic capacitance; and wherein the parasitic capacitance and compensation impedance for each sense line forms a capacitive divider.

9. The electronic device of claim 1, further comprising a sense circuit coupled to the plurality of sense lines and configured to process output from each of the plurality of sense lines, and to output a sense signal for each sense line.

10. The electronic device of claim 9, further comprising a digital circuit configured to program the capacitance value of each programmable value capacitor as a function of the sense signal for the sense line associated with each said programmable value capacitor.

11. The electronic device of claim 9, wherein the sense circuit processes the output from each of the plurality of sense lines by rejecting the display noise from the sense signal output for each sense line.

12. The electronic device of claim 9, wherein the sense circuit rejects the display noise by performing differential sensing of the plurality of sense lines.

13. The electronic device of claim 1, wherein each compensation impedance comprises a fixed value capacitor; and wherein each impedance value is a capacitance value.

14. The electronic device of claim 1, wherein each compensation impedance comprises a programmable value capacitor; and wherein each impedance value is a capacitance value.

15. A method of operating a touch sensing device having a display layer, a common voltage layer, and a sensing layer, the method comprising:
generating display noise by scanning the display layer;
capacitively coupling the display noise from the display layer to the common voltage layer via at least one parasitic impedance;
capacitively coupling the display noise from the common voltage layer to the each of a plurality of sense lines in the sensing layer via a different parasitic impedance; and
compensating for different amplitudes of the display noise and for the different parasitic impedances by directly electrically connecting each compensation impedance of a plurality of compensation impedances equal in number to the plurality of sense lines between a different one of the plurality of sense lines and ground in an unbroken fashion during operation of the touch sensing device and such that each sense line is directly electrically connected to one of the plurality of compensation impedances in an unbroken fashion during operation of the touch sensing device, wherein each of the compensation impedances has an impedance value such that an amplitude of the display noise at an output of each sense line is substantially equal.

16. The method of claim 15, further comprising driving the common voltage layer at a plurality of connection points, such that an amplitude of the display noise seen at an input to each sense line is a function of the location of that sense line with respect to the plurality of connection points.

17. The method of claim 16, wherein the driving of the common voltage layer at the plurality of connection points results in the amplitude of the display noise seen at the input to each sense line being a function of a distance of that sense line from the plurality of connection points, such that the amplitude of the display noise see at the input to sense lines closer to the plurality of connection points is less than the amplitude of the display noise seen at the input to sense lines farther from the plurality of connection points.

18. The method of claim 17, wherein the compensation impedances coupled to sense lines closer to the plurality of connection points are lesser in value than compensation impedances coupled to sense lines farther from the plurality of connection points.

19. The method of claim 15, further comprising processing output from each of the plurality of sense lines and outputting a sense signal for each sense line.

20. The method of claim 19, wherein processing the output from each of the plurality of sense lines comprises rejecting the display noise from the sense signal output for each sense line.

21. The method of claim 20, wherein the display noise is rejected by performing differential sensing of the plurality of sense lines.

22. An electronic device, comprising:
a display layer generating display noise based on scanning thereof;
a sensing layer including a plurality of sense lines;
a common voltage layer coupled to the display layer and the sensing layer, the common voltage layer capacitively coupling the display noise from the display layer to the each of the plurality of sense lines of the sensing layer via a different parasitic impedance; and
a plurality of compensation impedances, each compensation impedance being directly electrically connected to a different one of the plurality of sense lines in an unbroken fashion during operation of the electronic device, wherein each of the plurality of compensation impedances has an impedance value such that an amplitude of the display noise at an output of each sense line is substantially equal;
wherein the plurality of compensation impedances and the plurality of sense lines are equal in number.

23. The electronic device of claim 22, wherein the common voltage layer is driven at a plurality of connection points; and wherein an amplitude of the display noise seen at an input to each sense line is a function of the location of that sense line with respect to the plurality of connection points.

24. The electronic device of claim 23, wherein compensation impedances coupled to sense lines closer to the plurality of connection points are lesser in value than compensation impedances coupled to sense lines farther from the plurality of connection points.

25. The electronic device of claim 22, wherein each compensation impedance comprises a fixed value capacitor; and wherein each impedance value is a capacitance value.

26. The electronic device of claim 22, wherein each compensation impedance comprises a programmable value capacitor; and wherein each impedance value is a capacitance value.

* * * * *